(12) United States Patent
Zhang et al.

(10) Patent No.: US 11,764,630 B2
(45) Date of Patent: Sep. 19, 2023

(54) STATOR ASSEMBLY AND MOTOR

(71) Applicant: Jing-Jin Electric Technologies Co., Ltd., Beijing (CN)

(72) Inventors: Kaihe Zhang, Beijing (CN); Kunxing Sun, Beijing (CN); Liangliang Zhang, Beijing (CN); Chunxia Cai, Beijing (CN); Xuan Zou, Beijing (CN); Chunshuang Feng, Beijing (CN)

(73) Assignee: JING-JIN ELECTRIC TECHNOLOGIES CO., LTD.

( * ) Notice: Subject to any disclaimer, the term of this patent is extended or adjusted under 35 U.S.C. 154(b) by 114 days.

(21) Appl. No.: 17/512,030

(22) Filed: Oct. 27, 2021

(65) Prior Publication Data
US 2022/0255385 A1 Aug. 11, 2022

(30) Foreign Application Priority Data
Feb. 8, 2021 (CN) .......................... 202110172185.4

(51) Int. Cl.
*H02K 3/28* (2006.01)

(52) U.S. Cl.
CPC ........... *H02K 3/28* (2013.01); *H02K 2203/06* (2013.01); *H02K 2213/03* (2013.01)

(58) Field of Classification Search
CPC ......... H02K 3/28; H02K 3/12; H02K 2213/03
See application file for complete search history.

(56) References Cited

U.S. PATENT DOCUMENTS

2020/0014267 A1 1/2020 Rahman et al.
2022/0407378 A1* 12/2022 Zhu .......................... H02K 3/50

FOREIGN PATENT DOCUMENTS

CN 211606228 U 9/2020

OTHER PUBLICATIONS

European Search Report which issued in connection with a corresponding foreign application dated Apr. 20, 2022.
European Examination Report which issued in connection with a corresponding foreign application dated May 3, 2022.

* cited by examiner

*Primary Examiner* — Ramon M Barrera
(74) *Attorney, Agent, or Firm* — Clark Hill PLC; James R. Foley

(57) ABSTRACT

The present disclosure discloses a stator assembly and motor. The stator assembly comprises a stator core and a multi-branch rectangular conductor winding, an even number of stator slots are provided on an inner circumference of the stator core, and each of the stator slots is divided into multiple layers for accommodating rectangular conductors. The multi-branch rectangular conductor winding is provided in the stator slots, and the multi-branch rectangular conductor winding comprises B number of parallel branches, and B is an integer multiple of 4. The number of slots per phase per pole, Q, of the stator assembly is an odd number, and Q and B satisfy a relationship that both $(Q+1)*2/B$ and $(Q-1)*2/B$ are integers. In the stator assembly of the present disclosure, by way of the special winding connection design, there is no phase difference of magnetic fields between the parallel branches, and each parallel branch equally passes through each layer in the stator slots, which fundamentally inhibits the generation of circulating current between the parallel branches, suppresses the harmonics, and improves the efficiency of the motor.

12 Claims, 4 Drawing Sheets

STATOR ASSEMBLY AND MOTOR

TECHNICAL FIELD

The present disclosure belongs to the technical field of motors, and particularly relates to a stator assembly and motor.

BACKGROUND

The rectangular conductor motor has the advantages of high stator slot fill factor and large heat dissipation contact area, and has gradually become an important development direction of high power density motors. However, since the number of conductors in each slot of a rectangular conductor motor is relatively small, these conductors occupy different positions in the stator slots, and the magnetic circuit characteristics of the positions are different. In the winding design process of the rectangular conductor motor, it is difficult, for certain specific pole-slot matching structures, to find a multi-branch solution in which the magnetic circuit structure of the branches is completely consistent. Thus, there will be phase difference of magnetic fields between the branches, which will cause circulating current between the branches, introduce harmonics, and affect the performance of the motor such as efficiency and noise.

The conventional rectangular conductor motors usually choose a smaller number of parallel branches, for example two branches in parallel or only one branch. In this way, a structure where there is no circulating current between the branches can be easily designed, and the manufacturing process is also not complicated. However, due to the continuous increase of requirements for motor performance, when the motor needs to use more parallel branches, it is impossible to design a winding structure without a circulating current.

SUMMARY

In view of the above problems, the present disclosure discloses a stator assembly and motor to overcome the above problems or at least partially solve the above problems.

In order to achieve the above objects, the present disclosure adopts the following technical solutions:

In an aspect of the present disclosure, a stator assembly is disclosed. The stator assembly comprises a stator core and a multi-branch rectangular conductor winding, an even number of stator slots are provided on an inner circumference of the stator core, and each of the stator slots is divided into multiple layers for accommodating rectangular conductors;

the multi-branch rectangular conductor winding is provided in the stator slots, and the multi-branch rectangular conductor winding comprises B number of parallel branches, and B is an integer multiple of 4;

a number of slots per phase per pole, Q, of the stator assembly is an odd number, Q and B satisfy a relationship that both $(Q+1)*2/B$ and $(Q-1)*2/B$ are integers, and each of the parallel branches equally passes through each layer in the stator slots, so that there is no phase difference of magnetic fields between the parallel branches.

Further, the stator slots are numbered clockwise or counterclockwise as 1 to S, a 1st slot to an (S/2)-th slot are defined as a first region, and an (S/2)+1-th slot to an S-th slot are defined as a second region;

the parallel branches are numbered in sequence with an odd number or an even number respectively;

when the parallel branches are arranged in the stator slots, in each pair of magnetic poles in the first region, the parallel branches with an odd number appear $(Q+1)*2/B$ number of times in a first layer, a second layer, a fifth layer and a sixth layer, and appear $(Q-1)*2/B$ number of times in a third layer, a fourth layer, a seventh layer and an eighth layer;

in each pair of magnetic poles in the second region, the parallel branches with an odd number appear $(Q-1)*2/B$ number of times in a first layer, a second layer, a fifth layer and a sixth layer, and appear $(Q+1)*2/B$ number of times in a third layer, a fourth layer, a seventh layer and an eighth layer;

in each pair of magnetic poles in the first region, the parallel branches with an even number appear $(Q-1)*2/B$ number of times in a first layer, a second layer, a fifth layer and a sixth layer, and appear $(Q+1)*2/B$ number of times in a third layer, a fourth layer, a seventh layer and an eighth layer; and in each pair of magnetic poles in the second region, the parallel branches with an even number appear $(Q+1)*2/B$ number of times in a first layer, a second layer, a fifth layer and a sixth layer, and appear $(Q-1)*2/B$ number of times in a third layer, a fourth layer, a seventh layer and an eighth layer Further, the parallel branch is formed by connecting a first type of rectangular conductor coils or by connecting a first type of rectangular conductor coils and second type of rectangular conductor coils;

the first type of rectangular conductor coil comprises a slot inner part, a crossover part and a welding part, and the slot inner part comprises a first straight line segment and a second straight line segment;

the second type of rectangular conductor coil comprises a slot inner part, a lead-out terminal part and a welding part.

Further, the welding parts of the first type of rectangular conductor coils and the welding parts of the second type of rectangular conductor coils have a same bending structure;

or, the crossover parts of the first type of rectangular conductor coils have a same bending structure.

Further, a lead-out wire of the stator assembly is located at an end where the crossover part is, and each of the parallel branches comprises a plurality of the first type of rectangular conductor coils and two of the second type of rectangular conductor coils;

or, a lead-out wire of the stator assembly is located at an end where the welding part is, and each of the parallel branches only comprises a plurality of the first type of rectangular conductor coils.

Further, the heads of the parallel branches are connected to each other, and the tails of the parallel branches are connected to each other to form UVW three-phase windings, and the three-phase windings are connected by star connection or delta connection.

Further, a non-first parallel branch in a U-phase winding of the three-phase windings is obtained by rotating a first parallel branch clockwise or counterclockwise by multiple positioning slots; and a V-phase winding and a W-phase winding are obtained by rotating the U-phase winding clockwise or counterclockwise respectively by the same multiple positioning slots.

In another aspect of the present disclosure, a motor is disclosed. The motor comprises the stator assembly described in any one of the above and a rotor, and the rotor is coaxially arranged inside the stator assembly.

The advantages and beneficial effects of the present disclosure are as follows.

In the stator assembly of the present disclosure, there is no phase difference of magnetic fields between the parallel branches, and each parallel branch passes through each layer in the stator slot equally, which fundamentally inhibits the generation of circulating current between the parallel branches, suppresses the harmonics, and improves the efficiency of the motor.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, the same reference numerals are used to denote the same components. In the drawings.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described are only part of the embodiments of the present disclosure, rather than all of the embodiments. Based on the embodiments in the present disclosure, all other embodiments obtained by a person of ordinary skill in the art without paying creative work shall fall within the protection scope of the present disclosure.

In designing the stator with rectangular conductor winding, in order to obtain a winding structure without a circulating current, each branch needs to have $Q*2/B$ number of conductors for each pair of magnetic poles and each layer. For example, for a motor having 8 poles, 72 slots and 4 branches, the number of poles $P=8$, the number of stator slots $S=72$, the number of slots per phase per pole $Q=72/8/3=3$, $Q*2/B=1.5$, so the value may not be an integer, however, rectangular conductors must appear in integer numbers. Therefore, for this type of motor, there is currently no perfect design of the rectangular conductor winding without a circulating current.

The technical solutions according to the embodiments of the present disclosure will be described in detail below with reference to the accompanying drawings.

Figure 1:
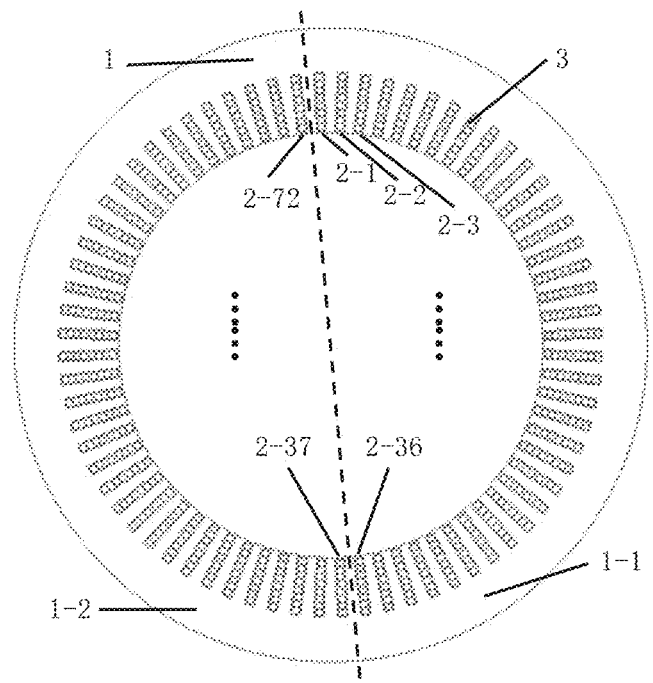
FIG. 1 is a radial cross-sectional view of a stator assembly according to an embodiment of the present disclosure.

The present disclosure first discloses a stator assembly. As shown in FIG. 1, the stator assembly comprises a stator core 1 and a multi-branch rectangular conductor winding 3. An even number of axially extending stator slots are provided evenly on an inner circumference of the stator core 1. The stator slots open radially inward, one end of the stator core slot is the insertion side, and the other end is the connection side. Each stator slot is divided into multiple layers for accommodating rectangular conductors. The stator slots are preferably divided into 6 or 8 layers.

The multi-branch conductor winding 3 is arranged in the stator slots, and comprises B number of parallel branches, and B is an integer multiple of 4. For example, there are 4 parallel branches or 8 parallel branches.

The number of slots per phase per pole, Q, of the stator assembly is an odd number, and Q and B satisfy a relationship that both $(Q+1)*2/B$ and $(Q-1)*2/B$ are integers, so that each branch has an integer number of rectangular conductors for each pair of magnetic poles and each layer, each of the parallel branches equally passes through each layer in the stator slots, and thus there is no phase difference of magnetic fields between the parallel branches.

In sum, in the stator assembly of the present embodiment, there is no phase difference of magnetic fields between the parallel branches, and each of the parallel branches equally passes through each layer in the stator slots, which fundamentally inhibits the generation of circulating current between the parallel branches, suppresses the harmonics, and improves the efficiency of the motor.

In a preferred embodiment, as shown in FIG. 1, the stator core 1 is equally divided into two regions in terms of the number of stator slots, and in different regions, the parallel branches are arranged in the stator slots in different ways. When the windings in the stator slots of each region are connected together, there is no phase difference of magnetic fields between the parallel branches, so that there is no circulating current between the parallel branches.

Specifically, the stator slots are numbered clockwise or counterclockwise as 1 to S, the 1st slot to the (S/2)-th slot are defined as the first region, and the (S/2)+1-th slot to the S-th slot are defined as the second region. For example, when the number of stator slots is 72, the stator slots are numbered clockwise or counterclockwise as 1 to 72 respectively, the 1st to 36th stator slots are defined as the first region 1-1, and the 37th to 72nd stator slots are defined as the second region 1-2.

The parallel branches are numbered in sequence with an odd number or an even number respectively.

When the parallel branches are arranged in the stator slots, in each pair of magnetic poles in the first region, the parallel branches with an odd number appear $(Q+1)*2/B$ number of times in a first layer, a second layer, a fifth layer and a sixth layer, and appear $(Q-1)*2/B$ number of times in a third layer, a fourth layer, a seventh layer and an eighth layer;

in each pair of magnetic poles in the second region, the parallel branches with an odd number appear $(Q-1)*2/B$ number of times in a first layer, a second layer, a fifth layer and a sixth layer, and appear $(Q+1)*2/B$ number of times in a third layer, a fourth layer, a seventh layer and an eighth layer;

in each pair of magnetic poles in the first region, the parallel branches with an even number appear $(Q-1)*2/B$ number of times in a first layer, a second layer, a fifth layer and a sixth layer, and appear $(Q+1)*2/B$ number of times in a third layer, a fourth layer, a seventh layer and an eighth layer; and in each pair of magnetic poles in the second region, the parallel branches with an even number appear (Q+1)*2/B number of times in a first layer, a second layer, a fifth layer and a sixth layer, and appear (Q−1)*2/B number of times in a third layer, a fourth layer, a seventh layer and an eighth layer In this way, the parallel branches are arranged in the two regions in different ways, so that there is no phase difference of magnetic fields between the parallel branches, and the generation of circulating currents between the parallel branches is inhibited.

Figure 2:
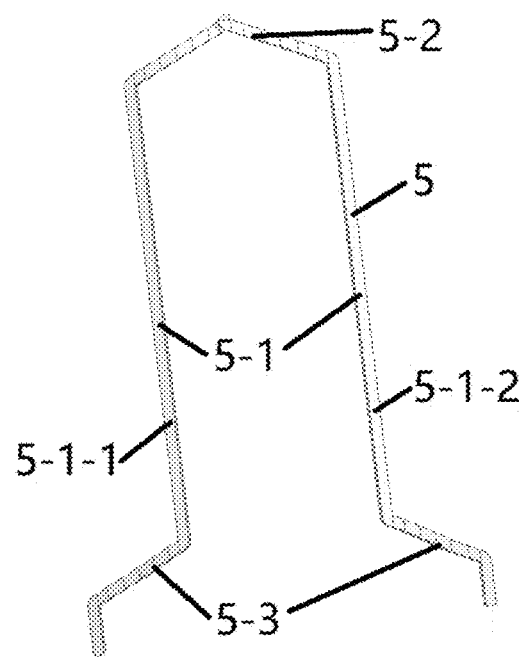
FIG. 2 is a diagram of the structure of a first type of rectangular conductor coil according to an embodiment of the present disclosure.
Figure 3:
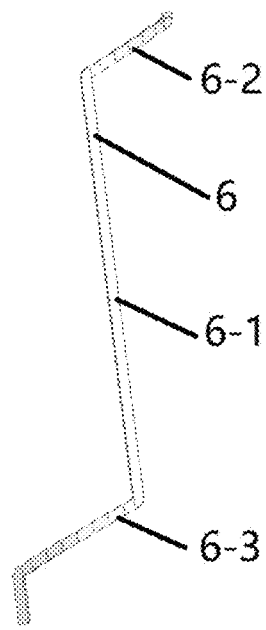
FIG. 3 is a diagram of the structure of a second type of rectangular conductor coil according to an embodiment of the present disclosure.

In an embodiment, as shown in FIGS. 2-3, the parallel branch is formed by connecting a first type of rectangular conductor coils 5 or by connecting a first type of rectangular conductor coils 5 and a second type of rectangular conductor coils 6. When the rectangular conductor coil comprises two straight line segments, and the two straight line segments are located in two adjacent layers of two different stator slots, the rectangular conductor coil is the first type rectangular conductor coil 5; and when the rectangular conductor coil comprises one straight line segment, the rectangular conductor coil is the second type rectangular conductor coil 6. The first type rectangular conductor coil 5 comprises a slot inner part 5-1, a crossover part 5-2 and a welding part 5-3. The slot inner part 5-1 comprises a first straight line segment and a second straight line segment. The second type rectangular conductor coil 6 comprises a slot inner part 6-1, a lead-out terminal part 6-2, and a welding part 6-3.

The slot inner part 5-1 is located in the stator slot. The crossover part 5-2 is used to connect the two straight line segments of the slot inner part 5-1 of the same first type of rectangular conductor coil 5 together. The welding part 5-3 is used to connect two different rectangular conductor coils by welding. The lead-out terminal part 6-2 is used as a lead-out terminal to connect the straight line segment of the slot inner part 6-1 of the second type of rectangular conductor coil 6 with the lead-out wire.

In a preferred embodiment, the welding parts 5-3 of the first type of rectangular conductor coils 5 and the second type of rectangular conductor coils 6 have the same bending structure, which greatly reduces the difficulty of shaping the end after the rectangular conductor coils are inserted into the stator slots, and facilitates the assembling and processing of the stator assembly.

In an embodiment, the crossover parts 5-2 of the first type of rectangular conductor coils 5 have the same bending structure, that is, there is only one hairpin shape, which simplifies the bending mold.

In an embodiment, the lead-out wire of the stator assembly is located at the end where the crossover part 5-2 is, and each of the parallel branches comprises a plurality of the first type of rectangular conductor coils 5 and two of the second type of rectangular conductor coils 6. Specifically, each parallel branch comprises S*P/B/3/2-1 number of the first type of rectangular conductor coils 5 and two of the second type of rectangular conductor coils 6.

In an embodiment, the lead-out wire of the stator assembly is located at the end where the welding part 5-3 is, and each parallel branch only comprises a plurality of the first type of rectangular conductor coils 5. Specifically, each parallel branch only comprises S*P/B/3/2 number of the first type of rectangular conductor coils 5, and does not comprise the second type of rectangular conductor coils 6.

In which S is the number of stator slots, P is the number of poles, and B is the number of parallel branches.

In an embodiment, the heads of the parallel branches are connected to each other, and the tails of the parallel branches are connected to each other to form UVW three-phase windings, and the three-phase windings are connected by star connection or delta connection. The star connection refers to connecting the tails of the three phases of the motor windings together, and the heads of the three phases is the power supply end, which is connected to the controller. The delta connection refers to connecting the tail of one phase winding to the head of the other phase winding and so on, and the three connection points are the power supply ends, which are connected to the controller.

In an embodiment, a non-first parallel branch in a U-phase winding of the three-phase windings is obtained by rotating a first parallel branch clockwise or counterclockwise by multiple positioning slots; and a V-phase winding and a W-phase winding are obtained by rotating the U-phase winding clockwise or counterclockwise respectively by the same multiple positioning slots.

The present disclosure also discloses a motor, which comprises the stator assembly of any one of the above embodiments and a rotor, and the rotor is coaxially arranged inside the stator assembly.

The motor in the present embodiment does not have a circulating current between different branches, and the energy conversion efficiency is high.

In order to describe the above embodiments in detail, the following two specific examples are given.

Example 1

In this example, a motor using the above stator assembly is disclosed. As shown in FIG. 1, the stator core 1 has 72 stator slots, numbered as 2-1, 2-2, . . . , 2-72, and each slot is provided with 8 layers of multi-branch rectangular conductor windings 3. The layer closest to the rotor is defined as the first layer, and so on, the layer closest to the inside of the stator slot is defined as the eighth layer.

The multi-branch rectangular conductor winding 3 is connected by star connection or delta connection, and the U-phase winding 3-1, the V-phase winding 3-2, and the W-phase winding 3-3 of the motor all include 4 parallel branches. In the parallel branches of U-phase winding 3-1, each of a first branch 4-1 of the U-phase, a second branch 4-2 of the U-phase, a third branch 4-3 of the U-phase, and a fourth branch 4-4 of the U-phase is formed by connecting 23 first type of rectangular conductor coils 5, two second type of rectangular conductor coils 6 and a lead-out wire. The V-phase winding 3-2 and W-phase winding 3-3 have the same structure as the U-phase winding 3-1. That is, the multi-branch rectangular conductor winding 3 is composed of 276 first type of rectangular conductor coils 5, 24 second type of rectangular conductor coils 6 and several lead-out wires.

As shown in FIG. 2, each first type of rectangular conductor coil 5 is composed of three parts: a slot inner part 5-1, a crossover part 5-2, and a welding part 5-3. The slot inner part 5-1 comprises a first straight line segment 5-1-1 and a second straight line segment 5-1-2, which are respectively located in two adjacent layers in two different slots. The function of the crossover part 5-2 is to connect the first straight line segment 5-1-1 and the second straight line segment 5-1-2 together. The welding part 5-3 is used to connect two different rectangular conductor coils by welding. In addition, as shown in FIG. 3, each second type of rectangular conductor coil 6 is also composed of three parts: a slot inner part 6-1, a lead-out terminal part 6-2 and a welding part 6-3. The slot inner part 6-1 comprises only one straight line segment. The lead-out terminal part 6-2 functions as a lead-out terminal for connecting the slot inner part 6-1 and the lead-out wire together. The welding part 6-3 is used to connect two different rectangular conductor coils by welding.

Figure 4:
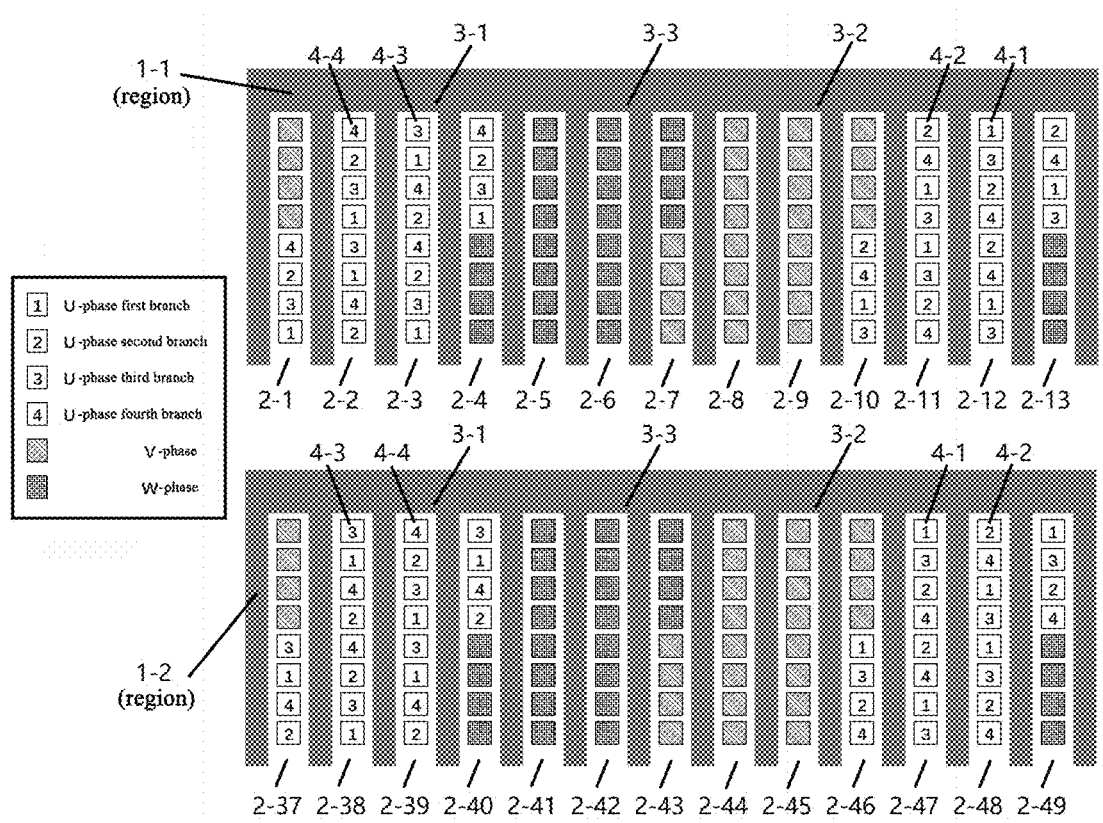
FIG. 4 is a schematic diagram of the arrangement of the parallel branches of U-phase rectangular conductors in slots according to an embodiment of the present disclosure.
Figure 5:
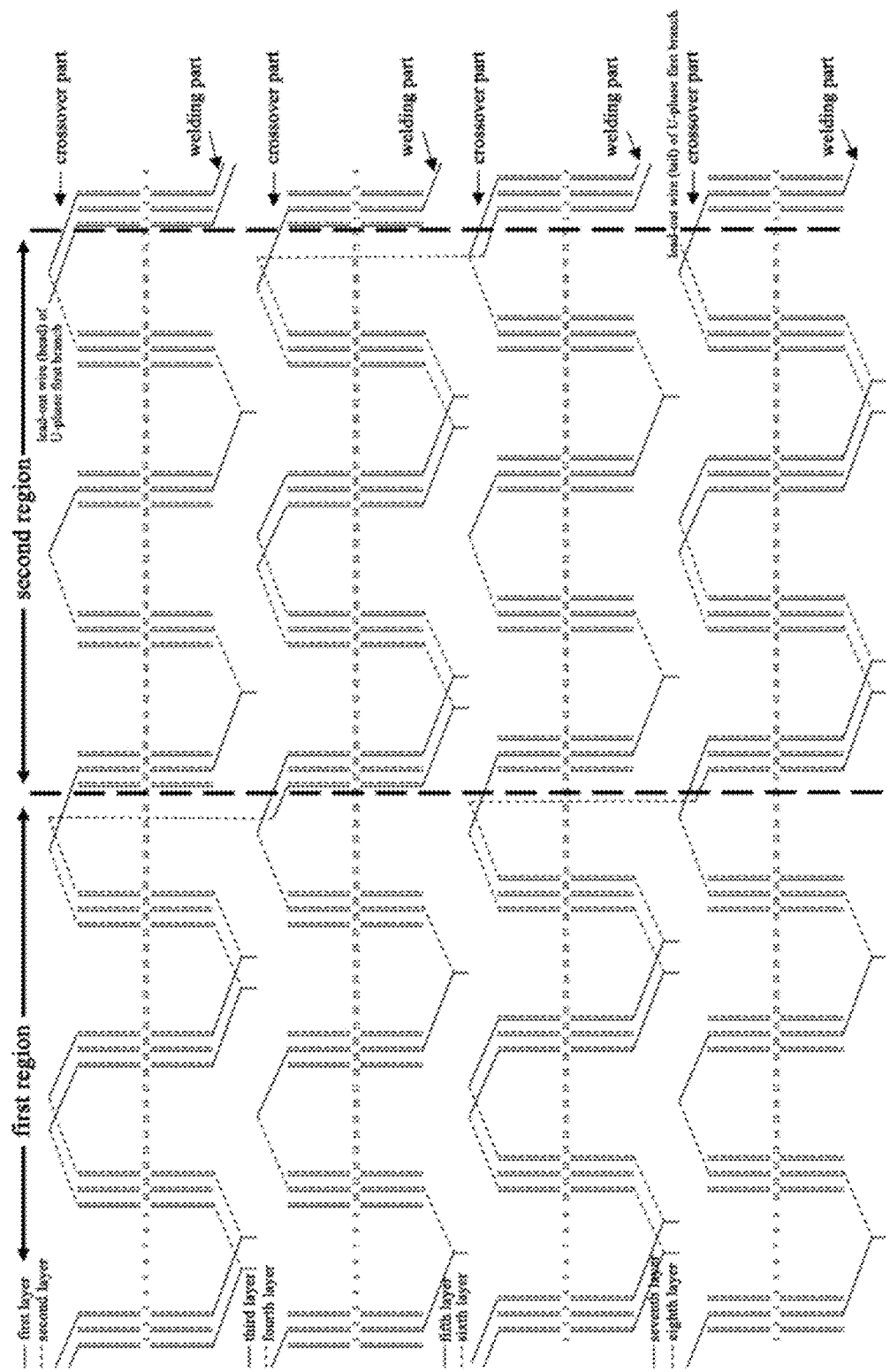
FIG. 5 is a schematic diagram of the winding connection of a first parallel branch of U-phase according to an embodiment of the present disclosure.

Specifically, the configuration of the multi-branch rectangular conductor winding 3 without a circulating current in this example is as follows. As shown in FIG. 1, first, the stator slots of the motor are numbered clockwise as 1 to 72 respectively, the 1st to 36th stator slots are defined as the first region 1-1, and the 37th to 72nd stator slots are defined as the second region 1-2. The arrangement of the multi-branch conductor winding 3 in the first region 1-1 and the second region 1-2 is different. As shown in FIG. 4, in the first region 1-1, the slot inner part 5-1 or 6-1 of the rectangular conductor coil 5 or 6 in the first branch 4-1 of the U-phase is placed in the first layer of slots 2-1, 2-3, 2-19 and 2-21, the second layer of slots 2-10, 2-12, 2-28 and 2-30, the third layer of slots 2-2 and 2-20, the fourth layer of slots 2-11 and 2-29, the fifth layer of slots 2-2, 2-4, 2-20 and 2-22, the sixth layer of slots 2-11, 2-13, 2-29 and 2-31, the seventh layer of slots 2-3 and 2-21, and the eighth layer of slots 2-12 and 2-30. In the second region 1-2, the slot inner part 5-1 or 6-1 of the rectangular conductor coil 5 or 6 in the first branch 4-1 of the U-phase is placed in the first layer of slots 2-38 and 2-56, the second layer of slots 2-47 and 2-65, the third layer of slots 2-37, 2-39, 2-55 and 2-57, the fourth layer of slots 2-46, 2-48, 2-64 and 2-66, the fifth layer of slots 2-39 and 2-57, the sixth layer of slots 2-48 and 2-66, the seventh layer of slots 2-38, 2-40, 2-56 and 2-58, and the eighth layer of slots 2-47, 2-49, 2-65, and 2-67. FIG. 5 is a schematic diagram of the winding connection of the first parallel branch 4-1 of the U-phase, and the lead-out wire is located at the end where the crossover part 5-2 or 6-2 is. The configuration of the second branch 4-2, the third branch 4-3, and the fourth branch 4-4 of the U-phase can be obtained by rotating a certain number of slots in the following manner.

The position of the slot inner part 5-1 or 6-1 of the rectangular conductor coil 5 or 6 in the second branch 4-2 of the U-phase is obtained by rotating clockwise by 36 slots on the basis of the first branch 4-1 of the U-phase. As shown in FIG. 4, in the first region 1-1, the slot inner part 5-1 or 6-1 of the rectangular conductor coil 5 or 6 is placed in the first layer of slots 2-2 and 2-20, the second layer of slots 2-11 and 2-29, the third layer of slots 2-1, 2-3, 2-19 and 2-21, the fourth layer of slots 2-10, 2-12, 2-28 and 2-30, the fifth layer of slots 2-3 and 2-21, the sixth layer of slots 2-12 and 2-30, the seventh layer of slots 2-2, 2-4, 2-20 and 2-22, and the eighth layer of slots 2-11, 2-13, 2-29, and 2-31. In the second region 1-2, the slot inner part 5-1 or 6-1 of the rectangular conductor coil 5 or 6 is placed in the first layer of slots 2-37, 2-39, 2-55, and 2-57, the second layer of slots 2-46, 2-48, 2-64 and 2-66, the third layer of slots 2-38 and 2-56, the fourth layer of slots 2-47 and 2-65, the fifth layer of slots 2-38, 2-40, 2-56 and 2-58, the sixth layer of slots 2-47, 2-49, 2-65 and 2-67, the seventh layer of slots 2-39 and 2-57, and the eighth layer of slots 2-48 and 2-66.

The position of the slot inner part 5-1 or 6-1 of the rectangular conductor coil 5 or 6 in the third branch 4-3 of the U-phase is obtained by rotating counterclockwise by 9 slots on the basis of the first branch 4-1 of the U-phase. Thus, the slot inner part 5-1 or 6-1 of the rectangular conductor coil 5 or 6 in the third branch 4-3 of the U-phase is placed in the first layer of slots 2-64, 2-66, 2-10, 2-12, 2-29 and 2-47, the second layer of slots 2-1, 2-3, 2-19, 2-21, 2-38 and 2-56, the third layer of slots 2-65, 2-11, 2-28, 2-30, 2-46 and 2-48, the fourth layer of slots 2-2, 2-20, 2-37, 2-39, 2-55 and 2-57, the fifth layer of slots 2-65, 2-67, 2-11, 2-13, 2-30 and 2-48, the sixth layer of slots 2-2, 2-4, 2-20, 2-22, 2-39 and 2-57, the seventh layer of slots 2-66, 2-12, 2-29, 2-31, 2-47 and 2-49, and the eighth layer of slots 2-3, 2-21, 2-38, 2-40, 2-56 and 2-58.

The position of the slot inner part 5-1 or 6-1 of the rectangular conductor coil 5 or 6 in the fourth branch 4-4 of the U-phase is obtained by rotating counterclockwise by 9 slots on the basis of the second branch 4-2 of the U-phase. The slot inner part 5-1 or 6-1 of the rectangular conductor coil 5 or 6 in the fourth branch 4-4 of the U-phase is placed in the first layer of slots 2-65, 2-11, 2-28, 2-30, 2-46 and 2-48, the second layer of slots 2-2, 2-20, 2-37, 2-39, 2-55 and 2-57, the third layer of slots 2-64, 2-66, 2-10, 2-12, 2-29 and 2-47, the fourth layer of slots 2-1, 2-3, 2-19, 2-21, 2-38 and 2-56; the fifth layer of slots 2-66, 2-12, 2-29, 2-31, 2-47 and 2-49, the sixth layer of slots 2-3, 2-21, 2-38, 2-40, 2-56 and 2-58, the seventh layer of slots 2-65, 2-67, 2-11, 2-13, 2-30 and 2-48, and the eighth layer of slots 2-2, 2-4, 2-20, 2-22, 2-39 and 2-57.

Using the structure of the slot inner part 5-1 or 6-1 of the winding as shown in FIG. 4, the branches 4-1, 4-2, 4-3 and 4-4 of the U-phase winding 3-1 will have the same number of conductors in each stator slot. For example, in the slot 2-1, there is one conductor of the first branch 4-1 of the U-phase, one conductor of the second branch 4-2 of the U-phase, one conductor of the third branch 4-3 of the U-phase, and one conductor of the fourth branch 4-4 of the U-phase. As another example, in the slot 2-2, there are two conductors of the first branch 4-1 of the U-phase, two conductors of the second branch 4-2 of the U-phase, two conductors of the third branch 4-3 of the U-phase, and two conductors of the fourth branch 4-4 of the U-phase. In addition, in each layer of all 72 slots, the number of conductors of each of the branch 4-1, 4-2, 4-3, and 4-4 of the U-phase winding is also the same. For example, in the first layer, there are six conductors of the first branch 4-1 of the U-phase, six conductors of the second branch 4-2 of the U-phase, six conductors of the third branch 4-3 of the U-phase, and six conductors of the fourth branch 4-4 of the U-phase. This completely symmetrical winding structure can eliminate the circulating current caused by the phase difference of magnetic fields between different branches, and improve the efficiency and reduce the noise of the motor effectively.

The branches 4-1, 4-2, 4-3, and 4-4 of the U-phase winding 3-1 are connected head-to-head and tail-to-tail to form the U-phase winding 3-1. In addition, for the V-phase winding 3-2, its configuration is obtained by rotating the U-phase winding 3-1 clockwise by 6 slots; for the W-phase winding 3-3, its configuration is obtained by rotating the U-phase winding 3-1 counterclockwise by 6 slots. Their details will not be described herein. The three-phase windings are connected by star connection or delta connection, and finally form a complete set of rectangular conductor windings 3 of the motor. The advantage of this structure is that the bending structures of the conductors of the welding parts 5-3 or 6-3 of all the rectangular conductor coils 5 or 6 are completely consistent, which can reduce the difficulty of shaping the conductor end after the rectangular conductors are inserted into the stator core.

Example 2

In this example, a motor using the above stator assembly is disclosed. As shown in FIGS. 1, 2 and 4, the arrangement and positions of the slot inner parts 5-1 of the branch coils are exactly the same as those of the Example 1.

The Example 2 differs from the Example 1 in that, taking the U-phase winding 3-1 as an example, each of its parallel branches 4-1, 4-2, 4-3, and 4-4 is formed by connecting 24 first type of rectangular conductor coil 5 and the lead-out wire without the second type of rectangular conductor coil 6. The composition of the V-phase winding 3-2 and the W-phase winding 3-3 is the same as that of the U-phase winding 3-1. Therefore, the multi-branch rectangular conductor winding 3 is composed of 288 first type of rectangular conductor coils 5 and several lead-out wires.

As shown in FIG. 2, the first type of rectangular conductor coil 5 is composed of three parts: an inner part 5-1, a crossover part 5-2, and a welding part 5-3. The slot inner part 5-1 comprises a first straight line segment 5-1-1 and a second straight line segment 5-1-2, which are respectively located in two adjacent layers in two slots spaced by 9 slots. The function of the crossover part 5-2 is to connect the first straight line segment 5-1-1 and the second straight line segment 5-1-2 together spaced by 9 slots. The welding part 5-3 is used to connect two different rectangular conductor coils by welding. In addition, there will be several welding parts 5-3 of the first type coil 5, which are used as lead-out terminals to connect the slot inner part 5-1 with the lead-out wire.

Figure 6:
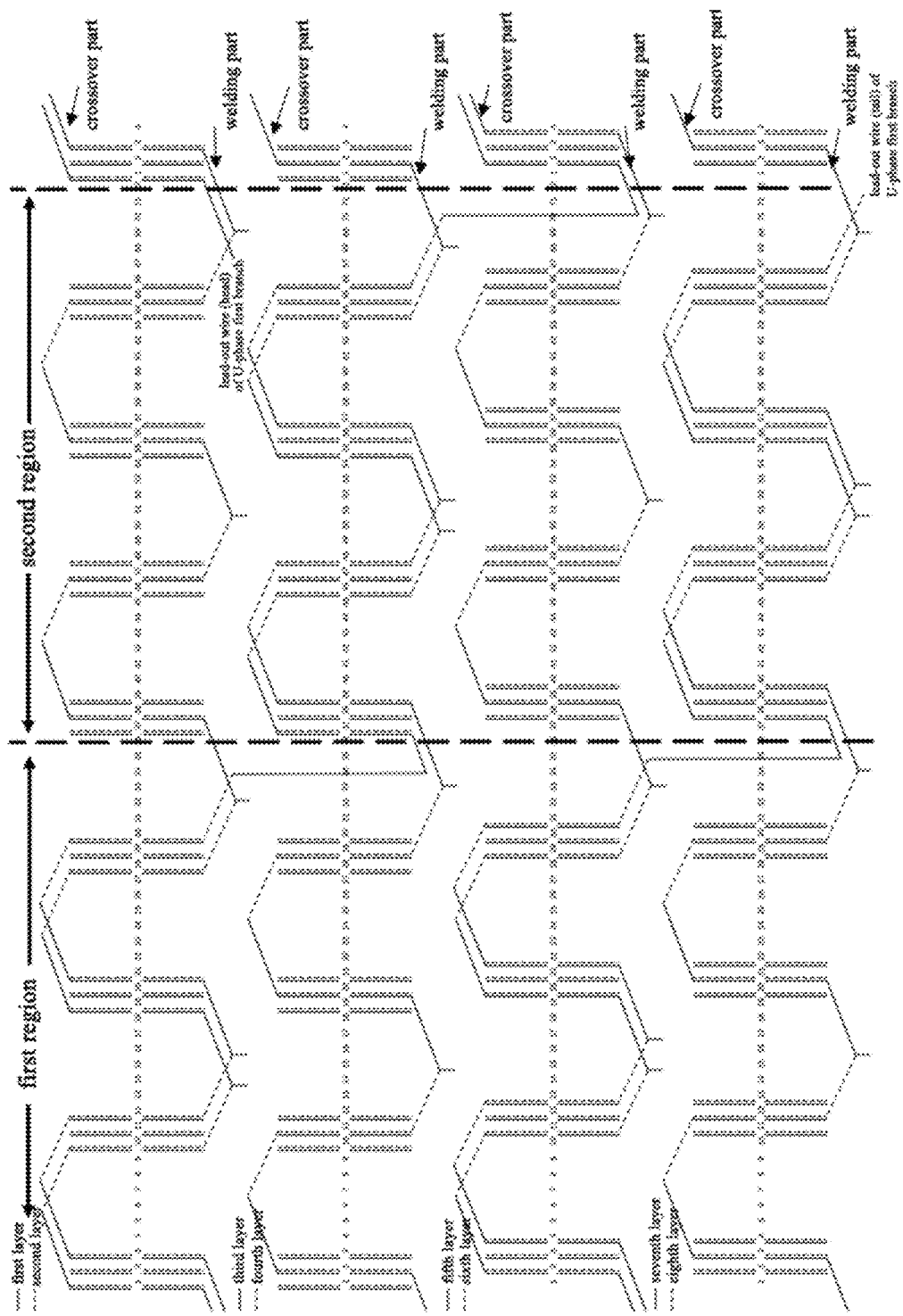
FIG. 6 is a schematic diagram of the winding connection of a first parallel branch of U-phase according to an embodiment of the present disclosure.

FIG. 6 is a schematic diagram of the winding connection of the first parallel branch 4-1 of the U-phase, in which the lead-out wire is located at the end where the welding part 5-3 is. The advantage of this structure is that the bending structure of the crossover part 5-2 of all the rectangular conductor coils 5 is completely consistent, that is, there is only one hairpin shape, which simplifies the bending mold. Similarly, the position of the slot inner part 5-1 of the rectangular conductor coil 5 in the second branch 4-2 of the U-phase is obtained by rotating clockwise by 36 slots on the basis of the first branch 4-1 of the U-phase; the position of the slot inner part 5-1 of the rectangular conductor coil 5 in the third branch 4-3 of the U-phase is obtained by rotating counterclockwise by 9 slots on the basis of the first branch 4-1 of the U-phase, and the position of the slot inner part 5-1 of the rectangular conductor coil 5 in the fourth branch 4-4 of the U-phase is obtained by rotating counterclockwise by 9 slots on the basis of the second branch 4-2 of the U-phase.

The branches 4-1, 4-2, 4-3, and 4-4 of the U-phase winding 3-1 are connected head-to-head and tail-to-tail to form the U-phase winding 3-1. In addition, for the V-phase winding 3-2, its configuration is obtained by rotating the U-phase winding 3-1 clockwise by 6 slots; for the W-phase winding 3-3, its configuration is obtained by rotating the U-phase winding 3-1 counterclockwise by 6 slots. The three-phase windings are connected by star connection or delta connection, and finally form a complete set of rectangular conductor windings 3 of the motor.

The above description is only specific embodiments of the present disclosure. Based on the above teachings of the present disclosure, those skilled in the art can make other improvements or modifications on the basis of the above embodiments. Those skilled in the art should understand that the above specific description is only for better explaining the present disclosure, and the protection scope of the present disclosure should be subject to the protection scope of the claims.

What is claimed is:

1. A stator assembly, wherein the stator assembly comprises a stator core and a multi-branch rectangular conductor winding, an even number of stator slots are provided on an inner circumference of the stator core, and each of the stator slots is divided into multiple layers for accommodating rectangular conductors;

the multi-branch rectangular conductor winding is provided in the stator slots, and the multi-branch rectangular conductor winding comprises B number of parallel branches, and B is an integer multiple of 4;
a number of slots per phase per pole, Q, of the stator assembly is an odd number, Q and B satisfy a relationship that both $(Q+1)*2/B$ and $(Q-1)*2/B$ are integers, and each of the parallel branches equally passes through each layer in the stator slots, so that there is no phase difference of magnetic fields between the parallel branches;
the stator assembly is characterized in that:
the stator slots are numbered clockwise or counterclockwise as 1 to S, a 1st slot to an (S/2)-th slot are defined as a first region, and an (S/2)+1-th slot to an S-th slot are defined as a second region;
the parallel branches are numbered in sequence with an odd number or an even number respectively;
when the parallel branches are arranged in the stator slots,
in each pair of magnetic poles in the first region, the parallel branches with an odd number appear $(Q+1)*2/B$ number of times in a first layer, a second layer, a fifth layer and a sixth layer, and appear $(Q-1)*2/B$ number of times in a third layer, a fourth layer, a seventh layer and an eighth layer;
in each pair of magnetic poles in the second region, the parallel branches with an odd number appear $(Q-1)*2/B$ number of times in a first layer, a second layer, a fifth layer and a sixth layer, and appear $(Q+1)*2/B$ number of times in a third layer, a fourth layer, a seventh layer and an eighth layer;
in each pair of magnetic poles in the first region, the parallel branches with an even number appear $(Q-1)*2/B$ number of times in a first layer, a second layer, a fifth layer and a sixth layer, and appear $(Q+1)*2/B$ number of times in a third layer, a fourth layer, a seventh layer and an eighth layer; and
in each pair of magnetic poles in the second region, the parallel branches with an even number appear $(Q+1)*2/B$ number of times in a first layer, a second layer, a fifth layer and a sixth layer, and appear $(Q-1)*2/B$ number of times in a third layer, a fourth layer, a seventh layer and an eighth layer.

2. The stator assembly according to claim 1, wherein the parallel branch is formed by connecting a first type of rectangular conductor coils or by connecting a first type of rectangular conductor coils and a second type of rectangular conductor coils;

the first type of rectangular conductor coil comprises a slot inner part, a crossover part and a welding part, and the slot inner part comprises a first straight line segment and a second straight line segment;
the second type of rectangular conductor coil comprises a slot inner part, a lead-out terminal part and a welding part.

3. The stator assembly according to claim 2, wherein the welding parts of the first type of rectangular conductor coils and the welding parts of the second type of rectangular conductor coils have a same bending structure;

or,
the crossover parts of the first type of rectangular conductor coils have a same bending structure.

4. The stator assembly according to claim 2, wherein a lead-out wire of the stator assembly is located at an end where the crossover part is, and each of the parallel branches comprises a plurality of the first type of rectangular conductor coils and two of the second type of rectangular conductor coils;
or,
   a lead-out wire of the stator assembly is located at an end where the welding part is, and each of the parallel branches only comprises a plurality of the first type of rectangular conductor coils.

5. The stator assembly according to claim 2, wherein heads of the parallel branches are connected to each other, and tails of the parallel branches are connected to each other to form UVW three-phase windings, and the three-phase windings are connected by star connection or delta connection.

6. A motor, wherein the motor comprises the stator assembly according to claim 2 and a rotor, and the rotor is coaxially provided inside the stator assembly.

7. The stator assembly according to claim 1, wherein heads of the parallel branches are connected to each other, and tails of the parallel branches are connected to each other to form UVW three-phase windings, and the three-phase windings are connected by star connection or delta connection.

8. The stator assembly according to claim 7, wherein a non-first parallel branch in a U-phase winding of the three-phase windings is obtained by rotating a first parallel branch clockwise or counterclockwise by multiple positioning slots; and a V-phase winding and a W-phase winding are obtained by rotating the U-phase winding clockwise or counterclockwise respectively by the same multiple positioning slots.

9. A motor, wherein the motor comprises the stator assembly according to claim 7 and a rotor, and the rotor is coaxially provided inside the stator assembly.

10. A motor, wherein the motor comprises the stator assembly according to claim 1 and a rotor, and the rotor is coaxially provided inside the stator assembly.

11. The stator assembly according to claim 1, wherein heads of the parallel branches are connected to each other, and tails of the parallel branches are connected to each other to form UVW three-phase windings, and the three-phase windings are connected by star connection or delta connection.

12. A motor, wherein the motor comprises the stator assembly according to claim 1 and a rotor, and the rotor is coaxially provided inside the stator assembly.

\* \* \* \* \*